United States Patent
Fujii

(10) Patent No.: US 11,584,064 B2
(45) Date of Patent: Feb. 21, 2023

(54) METHOD FOR PRODUCING HIGH-PRESSURE TANK

(71) Applicant: TOYOTA JIDOSHA KABUSHIKI KAISHA, Toyota (JP)

(72) Inventor: Manabu Fujii, Toyota (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 59 days.

(21) Appl. No.: 17/221,919

(22) Filed: Apr. 5, 2021

(65) Prior Publication Data

US 2021/0387400 A1    Dec. 16, 2021

(30) Foreign Application Priority Data

Jun. 11, 2020 (JP) .............. JP2020-101573

(51) Int. Cl.
*B29C 63/30* (2006.01)
*B29C 63/00* (2006.01)
*B29L 31/00* (2006.01)

(52) U.S. Cl.
CPC .......... *B29C 63/30* (2013.01); *B29C 63/0017* (2013.01); *B29L 2031/7156* (2013.01); *F17C 2203/0604* (2013.01); *F17C 2203/066* (2013.01); *F17C 2203/0619* (2013.01); *F17C 2203/0673* (2013.01)

(58) Field of Classification Search
CPC ........ F17C 2203/0673; F17C 2203/066; F17C 2203/0619; F17C 2203/0604; B29L 2031/7156; B29C 63/0017; B29C 63/30
See application file for complete search history.

(56) References Cited

U.S. PATENT DOCUMENTS

2013/0049256 A1    2/2013  Tani et al.
2015/0338022 A1*  11/2015  Tanabe .............. F17C 1/06
                                                            220/23.9

FOREIGN PATENT DOCUMENTS

| CN | 102906484 A | 1/2013 |
| JP | 2015102180 A | 6/2015 |
| JP | 2015218840 A | 12/2015 |
| JP | 2017129193 A | 7/2017 |
| JP | 2017194150 A | 10/2017 |

OTHER PUBLICATIONS

Machine translation of JP2017129193 A; Publication Jul. 27, 2017.*

* cited by examiner

*Primary Examiner* — Vishal I Patel
(74) *Attorney, Agent, or Firm* — Dickinson Wright, PLLC

(57) ABSTRACT

Provided is a method for producing a high-pressure tank that is capable of suppressing entry of a resin in a stiffener layer into the boundary between a liner body and a mouthpiece, and also offers excellent productivity. The method for producing a high-pressure tank includes disposing a resin sheet on a liner body having a mouthpiece, the resin sheet covering a gap between an outer circumferential portion of the mouthpiece and the liner body, and heating the resin sheet and welding the resin sheet to the mouthpiece and the liner body, to make a liner; and forming a fiber layer around the outer circumference of the liner, the fiber layer being impregnated with a resin, and curing the resin, wherein the softening point of a material constituting the resin sheet is higher than the maximum temperature that is reached by the liner due to heating of the resin.

2 Claims, 11 Drawing Sheets

METHOD FOR PRODUCING HIGH-PRESSURE TANK

FIELD

The present disclosure relates to a high-pressure tank that is stiffened by a fiber layer impregnated with a resin.

BACKGROUND

A high-pressure tank for fuel cell vehicles has a liner that forms a space inside thereof. A fiber layer that is impregnated with a resin is disposed around the outer circumference of the liner to form a stiffener layer, which realizes high strength. Here, some liners are each formed to have a tubular liner body, and mouthpieces that are arranged at the end portions of the liner body. For example, the liner body is made from a resin and the mouthpieces are made from a metal. In such a liner, the resin in the stiffener layer may enter between the liner body and the mouthpieces, which causes some malfunction. For this, for example, Patent Literatures 1 to 4 are disclosed.

Patent Literature 1 discloses that a liquid gasket (FIPG: Formed In Place Gasket) is applied to and cured over, or a film is applied to the outer circumference of a liner which includes boundary portions between a liner body and mouthpieces.

Patent Literature 2 discloses that caps are attached, with an adhesive, to outer circumferential portions of a liner which includes boundary portions between a liner body and mouthpieces.

Patent Literature 3 discloses that caps including protruding pieces to be inserted into gaps that are boundaries between a liner body and mouthpieces are arranged.

Patent Literature 4 discloses that a FIPG or a CIPG (Cured in Place Gasket) is applied to and cured over the outer circumference of a liner which includes boundary portions between a liner body and mouthpieces.

CITATION LIST

Patent Literature

Patent Literature 1: JP 2015-218840 A
Patent Literature 2: JP 2017-194150 A
Patent Literature 3: JP 2017-129193 A
Patent Literature 4: JP 2015-102180 A

SUMMARY

Technical Problem

In conventional techniques, there is a problem with efficiency for providing a means of preventing a resin in a stiffener layer from entering boundary portions between a liner body and mouthpieces, which makes it difficult to improve productivity of high-pressure tanks.

The present disclosure was made with these actual circumstances in view. A major object of the present disclosure is to provide a method for producing a high-pressure tank that is capable of suppressing entry of a resin in a stiffener layer into the boundary between a liner body and a mouthpiece, and also offers excellent productivity.

Solution to Problem

The present application discloses a method for producing a high-pressure tank, the method comprising: disposing a resin sheet on a liner body having a mouthpiece, the resin sheet covering a gap between an outer circumferential portion of the mouthpiece and the liner body, and heating the resin sheet and welding the resin sheet to the mouthpiece and the liner body, to make a liner; and forming a fiber layer around an outer circumference of the liner, the fiber layer being impregnated with a resin, and curing the resin, wherein a softening point of a material constituting the resin sheet is higher than a maximum temperature, the maximum temperature being reached by the liner due to heating of the resin.

Here, "forming a fiber layer around an outer circumference of the liner, the fiber layer being impregnated with a resin" encompasses both winding fiber impregnated with a resin in advance around the outer circumference of the liner, and winding fiber around the outer circumference of the liner and thereafter making the resin permeate the fiber at high pressure.

The mouthpiece may have a disk-shaped flange part, and the resin sheet may be arranged so as to cover at least part of a face of the flange part.

The resin sheet may be made from a nylon resin.

Advantageous Effects

According to the present disclosure, welding a resin sheet makes it possible to suppress a resin in a stiffener layer entering a boundary between a liner body and a mouthpiece, and to obtain excellent productivity.

DESCRIPTION OF EMBODIMENTS

1. Structure of High-Pressure Tank

Figure 1:
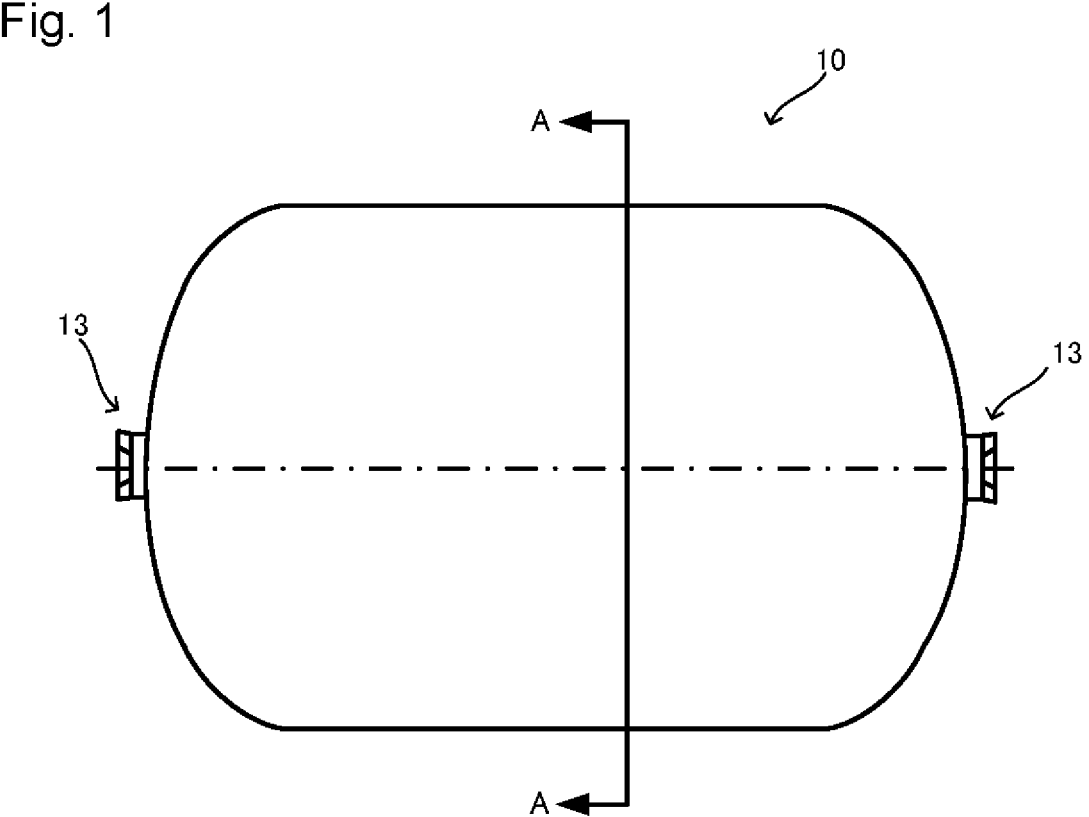
FIG. 1 schematically shows an external appearance of a high-pressure tank 10.
Figure 2:
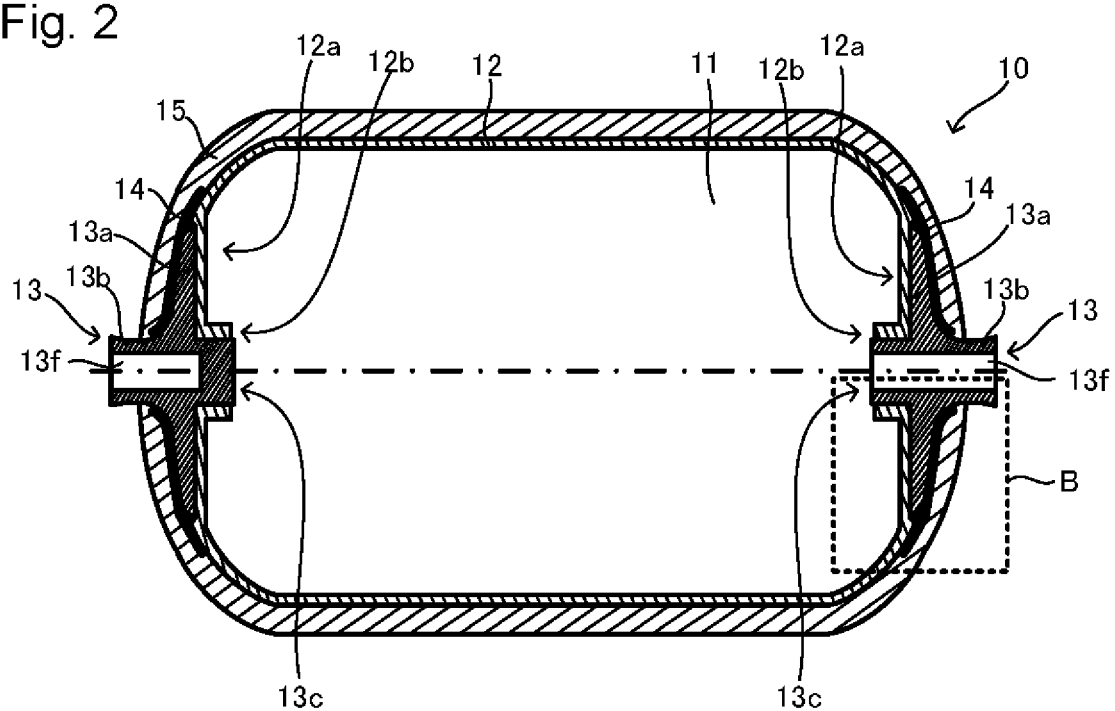
FIG. 2 is a cross-sectional view taken along the axial direction of the high-pressure tank 10.
Figure 3:
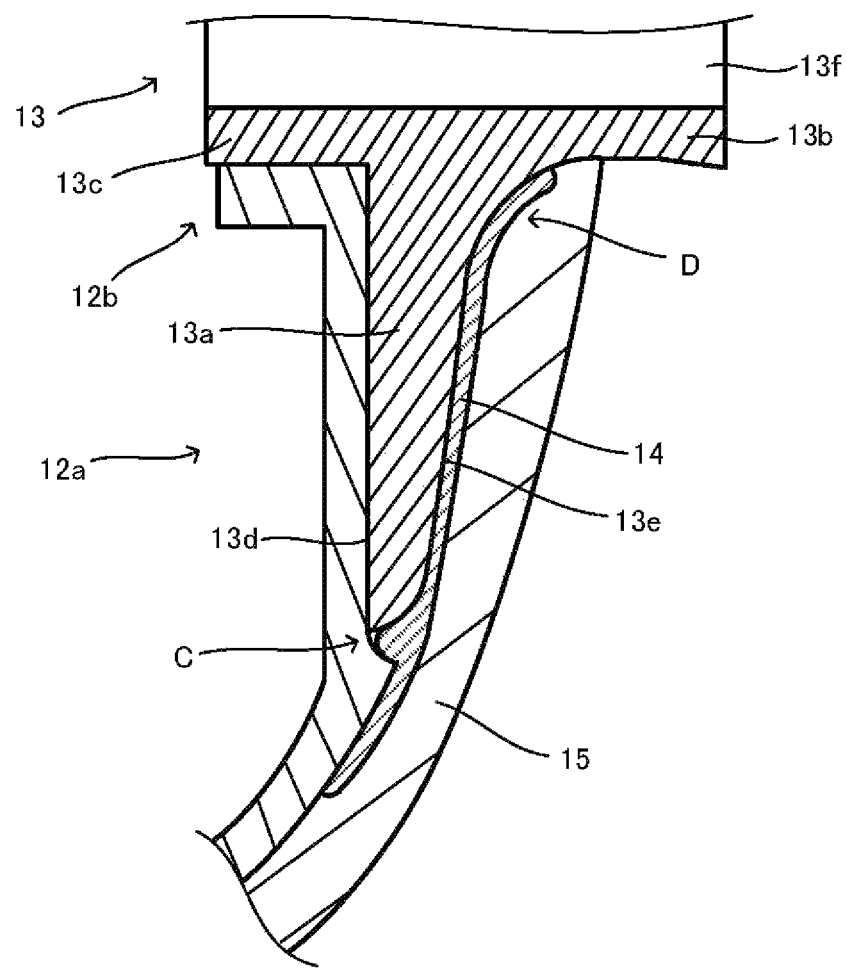
FIG. 3 is a partially enlarged view of FIG. 2.
Figure 4:
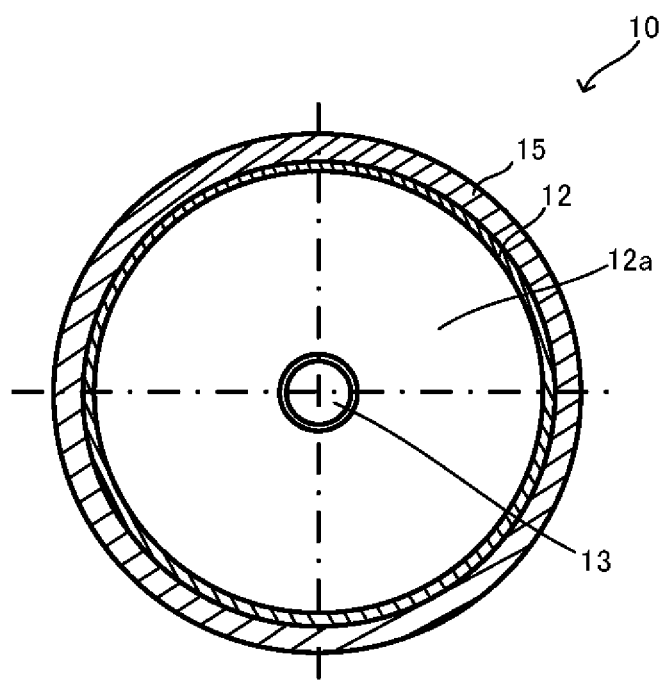
FIG. 4 is a cross-sectional view taken along a direction orthogonal to the axis of the high-pressure tank 10.

FIG. 1 schematically shows the external appearance of a high-pressure tank 10 according to one embodiment, and FIG. 2 schematically shows a cross section taken along the axis of the high-pressure tank 10. FIG. 3 is an enlarged view of the portion indicated by B in FIG. 2, and FIG. 4 is a cross-sectional view taken along the arrows A-A in FIG. 1. As can be seen from these figures, the high-pressure tank 10 includes a liner 11 and a stiffener layer 15. The structure of each of the foregoing will be described below.

<Liner>

Figure 5:
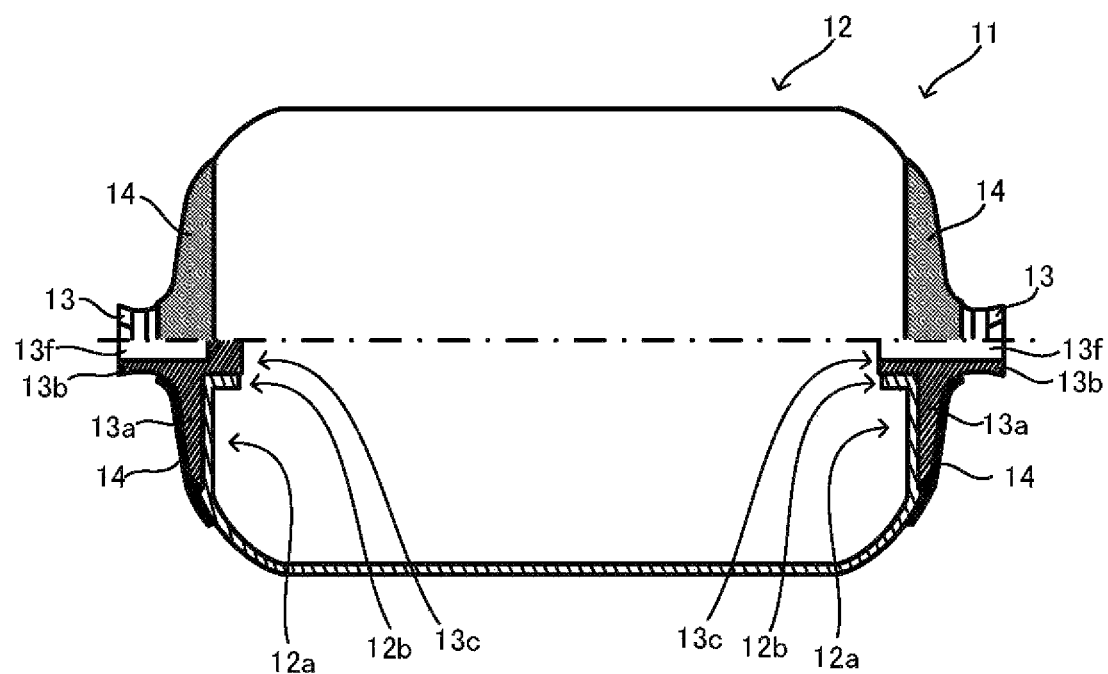
FIG. 5 is a partial cross-sectional view of a liner 11.
Figure 6:
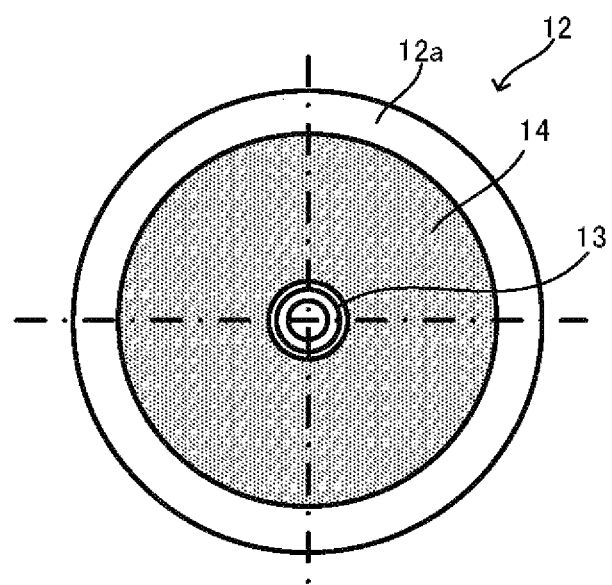
FIG. 6 is a right side view of the liner 11.

The liner 11 is a hollow member that defines the space inside the high-pressure tank 10. FIG. 5 is a partial cross-sectional view (the upper portion of FIG. 5 shows the outer surface, and the lower portion thereof shows a cross section) of the liner 11. FIG. 6 is a right side view of the liner 11. As can be seen from FIGS. 1 to 6, in this embodiment, the liner 11 includes a liner body 12, mouthpieces 13 and resin sheets 14.

The liner body 12 is a tubular member, and holds anything housed in the space thereinside (for example, hydrogen) without any leakage. More specifically, the diameter of the liner body 12 is shortened at both axial ends of the tube, to form end portions 12a. Openings 12b where the mouthpieces 13 are arranged are formed at the central portions of these end portions 12a at both ends of the tubular liner body 12 in the axial direction. This openings 12b are shaped so that protruding portions 13c of the mouthpieces 13 can be fit thereinto.

The liner body 12 may be constituted of any known material as long as the material is capable of holding the housed in the space inside the liner body 12 without any leakage. For example, the liner body 12 is constituted of a resin such as nylon resins and polyethylene synthetic resins.

The thickness of the liner body 12 is not particularly limited, but is preferably approximately 0.5 mm to 3.0 mm in view of reducing the weight.

The mouthpieces 13 are metal members that are arranged at the end portions 12a of the liner body 12. The mouthpieces 13 are used as chuck parts when the high-pressure tank 10 is produced, and form ports when the high-pressure tank 10 is filled with the housed and when the housed is taken out of the high-pressure tank 10. In this embodiment, each of the mouthpieces 13 has a flange part 13a, a mouthpiece body 13b and the protruding portion 13c.

The flange part 13a is disk-shaped, and the outer circumferential edge thereof forms a circle in this embodiment. The present disclosure is not limited to this, and toothed serration may form the outer circumferential edge. This makes it possible to transmit acceleration and/or retardation torque when fiber for the stiffener layer is wound, from the mouthpiece to the liner body.

A board face 13d that is one side of the disk-shaped flange part (face facing the end portion 12a of the liner body 12) is flat, and a board face 13e that is the other side thereof (face opposite the end portion 12a of the liner body 12) is formed so that the flange part 13a is thicker at a portion thereof closer to the center of the disk.

The mouthpiece body 13b is a protruding part that is disposed at the center of the flange part 13a on the board face 13e side.

The protruding portion 13c is a protruding portion that is disposed at the center of the flange part 13a on the board face 13d side.

The mouthpiece 13 has a hole 13f so as to make the flange part 13a, the mouthpiece body 13b and the protruding portion 13c communicate with each other. The hole 13f of one of the two mouthpieces 13, which are included in the liner 11, penetrate the flange part 13a, the mouthpiece body 13b and the protruding portion 13c, to penetrate the mouthpiece 13. In contrast, the hole 13f of the other mouthpiece 13 is formed without penetrating the protruding portion 13c.

The protruding portions 13c of such mouthpieces 13 are inserted into the openings 12b of the end portions 12a of the liner body 12, so as to position the mouthpieces 13 with respect to the liner body 12, and the flat board faces 13d of the flange parts 13a are arranged so as to be superimposed on the flat outside end faces of the end portions 12a of the liner body 12.

This allows the inside and the outside of the liner 11 to communicate with each other through the mouthpiece 13 that is penetrated by the hole 13f. This mouthpiece 13 is formed so that, for example, a valve or the like is attachable thereto, which makes it possible to take out the housed in the liner body 12. In contrast, the inside and the outside of the liner 11 do not communicate with each other at the mouthpiece 13 that is not penetrated by the hole 13f, so that the liner 11 is formed so as not to leak the housed in the liner body 12.

The resin sheets 14 are annular sheet-like members that are made from a resin. The material constituting the resin sheets 14 is not particularly limited, but is preferably a thermoplastic resin, and is preferably a resin having a softening point higher than the maximum temperature that is reached by a resin in the stiffener layer 15 or the liner 11 when heating is performed for forming the stiffener layer 15. This can suppress any changes in the thickness of the resin sheets 14 and deformation such that the resin sheets 14 partially enter any other portions when heating is performed when the stiffener layer is formed as well.

Here, the softening point shall be a Vicat softening temperature (VST) in ISO 306 (JIS K7206) measured by the B50 method.

For example, if the maximum temperature reached by the stiffener layer 15 and the liner 11 when the resin in the stiffener layer 15 is cured is set in 160° C., the softening point of the resin sheets is set to be equal to or higher than this, and for example, nylon 6 (softening point: 180° C.), nylon 66 (softening point: 230° C.), or a polyester (softening point: 240° C.) may be used. Among them, for example, if the material of the resin sheets 14 and the material of the liner body 12 are the same (nylon resin), adhesion (weldability) between the liner body 12 and the resin sheets 14 can be enhanced more when the resin sheets 14 are arranged.

The thickness of the resin sheets 14 is not particularly limited. This thickness is preferably at least 0.05 mm at portions of the resin sheets 14 which are located over the faces 13e of the mouthpieces 13 although it is assumed that there are a slight change in thickness after the resin sheets 14 are arranged as members composing the high-pressure tank, and difference in thickness according to portions since the thickness of the resin sheets prepared when the high-pressure tank is produced (resin sheets prepared in the step S11 of cutting out the resin sheets) is preferably 0.05 mm to 2.0 mm as described later.

The sizes of the annular outer and inner circumferences of each of the resin sheets 14 can be considered as follows.

In a state where the liner body 12 and the mouthpieces 13 are combined, a gap C is generated between an outer circumferential portion of each of the flange parts 13a and the liner body 12 as indicated by C in FIG. 3. The fluid resin in the stiffener layer may enter into this gap while the high-pressure tank 10 is produced, to cause some malfunction. Therefore, the outer and inner circumferences of each of the resin sheets 14 are disposed so that the resin sheet 14 covers at least this gap C. That is, the resin sheet 14 covers the gap C, and at the same time a portion thereof on the outer circumference side of the portion thereof covering this gap C is welded to the liner body 12 (joining state where the resin sheet 14 and the liner body 12 are mixed with each other so that the interface thereof is unclear) and a portion thereof on the inner circumference side of the portion thereof covering the gap C is adhered to the face 13e of the mouthpiece 13 (joining state by a physical anchor effect). This results in the gap C covered with the resin sheet 14, which can suppress the resin in the stiffener layer entering the gap C.

The resin sheets 14 are arranged between the faces 13e of the flange parts 13a of the mouthpieces 13 and the stiffener layer 15, which can suppress an abnormal noise that is especially produced when the liner body 12 and the stiffener layer 15 expand or contract in the production of and in the use of the high-pressure tank.

Such production of an abnormal noise is caused by stick-slip when the liner body 12 and the stiffener layer 15 expand or contract due to a thermal or physical influence so that the faces 13e of the mouthpieces 13 and the stiffener layer 15 relatively slide over each other. Conventionally, for example, such a measure is taken that a lubricant is applied to the mouthpieces as described in Patent Literature 4.

In contrast, according to the present disclosure, the resin sheets 14 are arranged between the faces 13e of the mouthpieces 13 and the stiffener layer 15, which can suppress the foregoing production of an abnormal noise. This is believed to be because arrangement of the elastically deformable resin sheets 14 between the faces 13e of the mouthpieces 13 and the stiffener layer 15 suppresses stick-slip. That is, the present disclosure makes it possible to achieve not only the object of suppressing the entry of the resin in the stiffener layer 15 into the gaps C, but also the object of suppressing production of an abnormal noise.

In view of more remarkably exerting the effect of suppressing production of an abnormal noise, the inner circumferential sides of the resin sheets 14 preferably reach locations close to the mouthpiece bodies 13b. Specifically, each of these inner circumferential sides preferably covers a half or more of the face 13e of the flange part 13a of each of the mouthpieces 13 in the diameter direction, further preferably covers the entire face 13e of the flange part 13a, and most preferably covers the face 13e of the flange part 13a, and a reentrant part that is a connection portion of the face 13e of the flange part 13a and the mouthpiece body 13b as indicated by D in FIG. 3.

<Stiffener Layer>

The stiffener layer 15 has a fiber layer, and the resin that is impregnated with the fiber layer and cured. The fiber layer is formed by winding many layers of bundles of fiber around the outer surface of the liner 11 by a predetermined thickness.

A carbon fiber is used for the bundles of fiber of the fiber layer. The bundles of fiber are bundles of a carbon fiber in the form of a belt having a predetermined cross-sectional shape (e.g., rectangular cross section). This cross-sectional shape is not particularly limited, but may be a rectangle of approximately 6 mm to 9 mm in width and 0.1 mm to 0.15 mm in thickness. The amount of a carbon fiber contained in the bundles of fiber is not particularly limited either. For example, the bundles of fiber are formed of approximately 36000 strands of a carbon fiber.

Such bundles of fiber formed of a carbon fiber are wound around the outer surface of the liner 11, to form the fiber layer.

The resin impregnated with the fiber layer and cured in the stiffener layer 15 is not particularly limited as long as permeating the fiber layer with fluidity first and thereafter curing by some method to make it possible to increase the strength of the fiber layer. Examples of the resin include thermosetting resins that cure by heat, such as epoxy resins and unsaturated polyester resins each including an amine or anhydride-based curing accelerator and a rubber-based reinforcing agent. Examples of the resin also include thermoplastic resins, and resin compositions containing an epoxy resin as a main agent: a curing agent is mixed to the resin composition to cure the resin composition.

<Others>

In addition to the foregoing, a protective layer may be provided with the high-pressure tank if necessary. The protective layer is a layer that is arranged on the outer circumference of the stiffening layer, and is formed by winding a glass fiber and impregnating the glass fiber with a resin. The resin with which the glass fiber is impregnated may be considered same as the stiffening layer. This can give the high-pressure tank impact resistance. The thickness of the protective layer is not particularly limited, but may be approximately 1.0 mm to 1.5 mm.

2. Production Method

Figure 7:
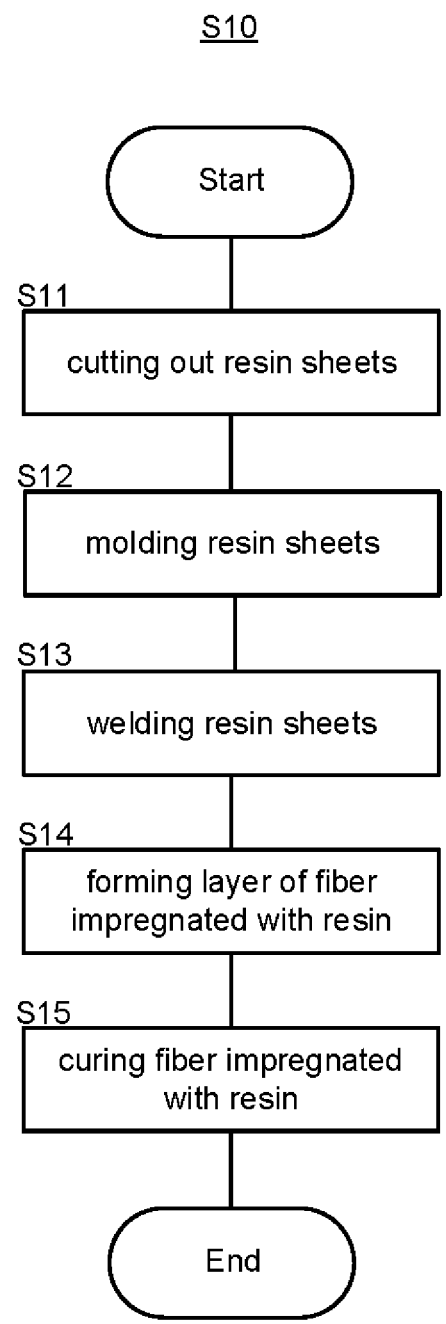
FIG. 7 is a flowchart of a method for producing a high-pressure tank S10.

FIG. 7 is a flowchart of a method for producing a high-pressure tank S10 according to one embodiment. As can be seen from FIG. 7, the method for producing a high-pressure tank S10 includes a step S11 of cutting out resin sheets, a step S12 of molding the resin sheets, a step S13 of welding the resin sheets, a step S14 of forming a layer of the fiber impregnated with a resin, and a step S15 of curing the fiber impregnated with a resin. Hereinafter each step will be described.

<Step of Cutting Out Resin Sheets>

Figure 8:
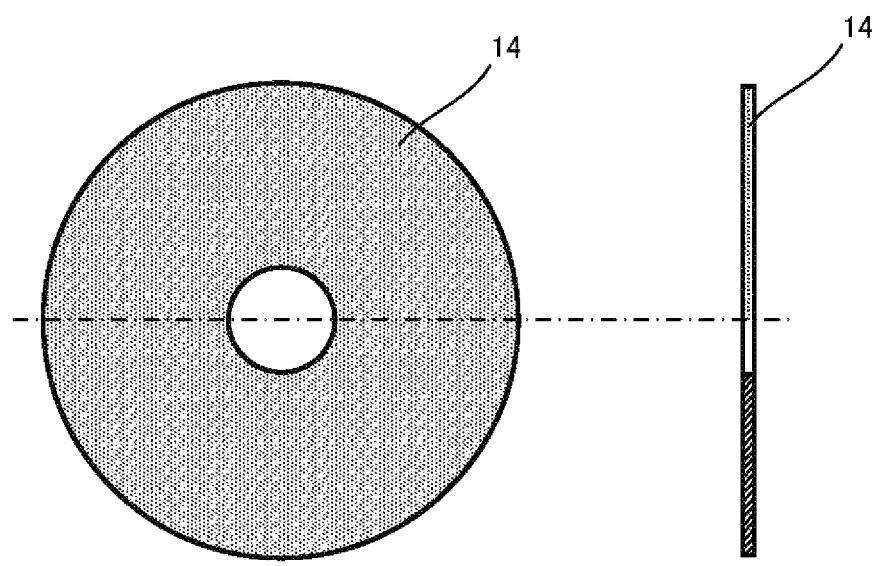
FIG. 8 illustratively shows a step S11 of cutting out a resin sheet, and is a front view and a partial cross-sectional view of a resin sheet 14.

In the step S11 of cutting out resin sheets (which may be referred to as "step S11"), the resin sheets 14 are cut out to be prepared. FIG. 8 is a front view (left in FIG. 8) and a partial cross-sectional view (right in FIG. 8) of one of the resin sheets 14, which is cut out. As described above, in this embodiment, the resin sheet 14 has an annular shape. Each of the resin sheets 14 prepared in the step S11 is flat on both faces thereof.

The thickness of the resin sheets 14 prepared in the step S11 is not particularly limited, but is preferably 0.5 mm to 2.0 mm. The size of each of the resin sheets 14 is such that: the resin sheets 14 are arranged so as to cover the gaps between the liner body 12 and the outer circumferential portions of the flange parts 13a of the mouthpieces 13 (gap C in FIG. 3), and a portion of each of the resin sheets 14 on the outer circumference side of the portion thereof covering this gap C is superimposed on the liner body 12 and a portion thereof on the inner circumference side of the portion thereof covering the gap C is superimposed on the face 13e of the flange part 13a as described above. In this embodiment, in view of more remarkably suppressing stick-slip as described above, holes as small as possible for the mouthpiece bodies 13b of the mouthpieces 13 to pass therethrough are formed for the inner circumferences of the resin sheets 14.

The material of the resin sheets 14 prepared in the step S11 is as described above.

<Step of Molding Resin Sheets>

In the step S12 of molding the resin sheets (which may be referred to as "step S12"), the resin sheets 14 prepared in the step S11 are molded so as to have a shape following parts where the resin sheets 14 are to be arranged. This makes it possible to arrange the resin sheets 14 more accurately. Therefore, it is not always necessary to include the step S12. It is sufficient to include the step S12 if necessary.

Figure 9:
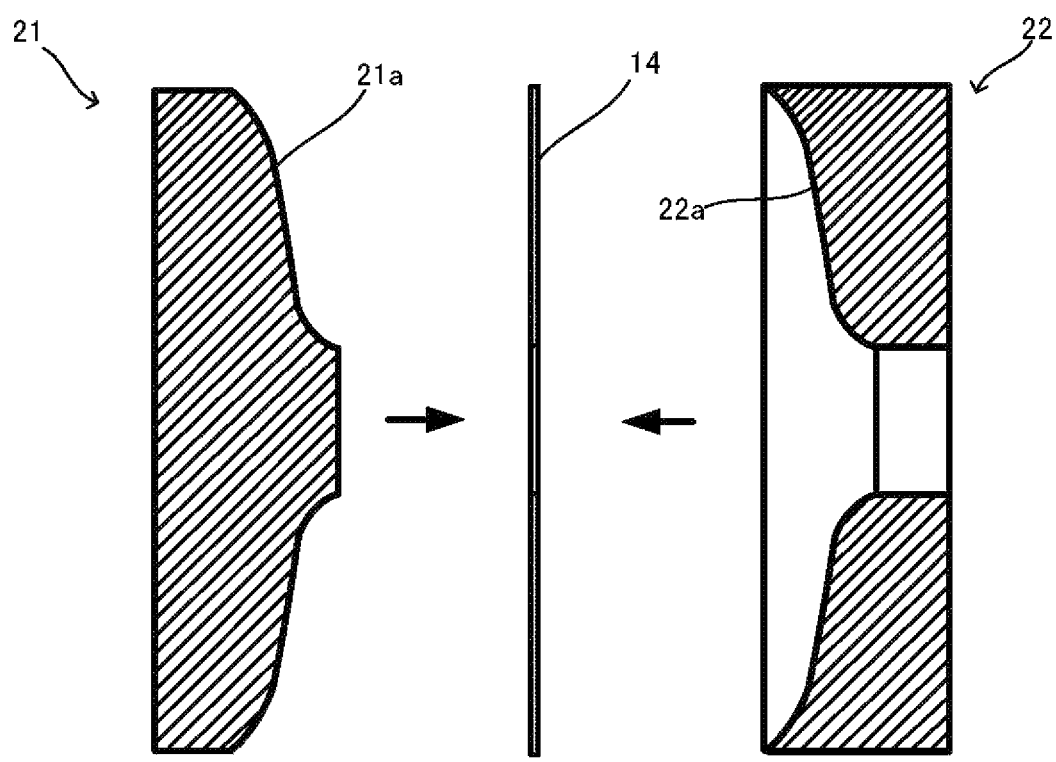
FIG. 9 illustratively shows a step S12 of molding the resin sheet.
Figure 10:
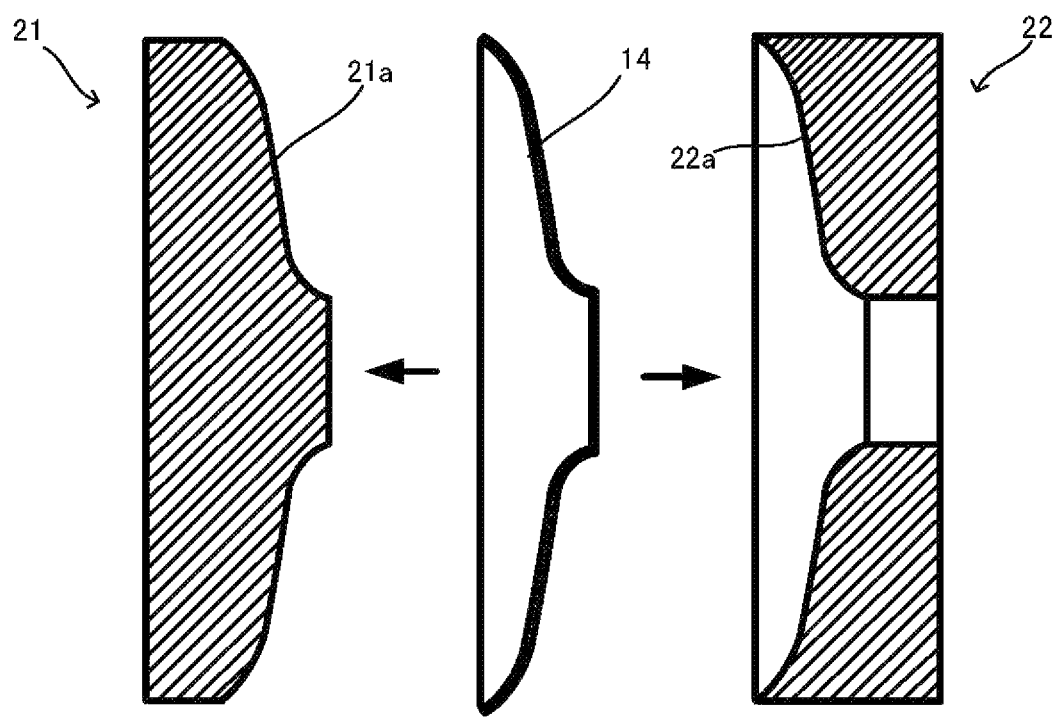
FIG. 10 illustratively shows the step S12 of molding the resin sheet.

The method for molding the resin sheets 14 is not specifically limited in particular. FIGS. 9 and 10 illustratively show one example. In this example, a die 21 having a protruding face 21a that is shaped following the part where each of the resin sheets 14 is arranged, and a mold 22 having a recessed face 22a that is shaped following the part where each of the resin sheets 14 is arranged are prepared; and each of the resin sheets 14 prepared in the step S11 is arranged between the protruding face 21a and the recessed face 22a as in FIG. 9, and the die 21 and the mold 22 are pressed against the resin sheet 14 so that the resin sheet 14 is sandwiched between the protruding face 21a and the recessed face 22a. At this time, at least one of the die 21 and the mold 22 is heated to heat the resin sheet 14 so that the temperature of the resin sheet 14 is at least the softening point thereof.

This results in the resin sheet 14 molded to have protruding and recessed faces following the shape of the part where the resin sheet 14 is to be arranged after the die 21 and the mold 22 are separated from the resin sheet 14 as shown in FIG. 10.

<Step of Welding Resin Sheets>

In the step S13 of welding the resin sheets (which may be referred to as "step S13"), the resin sheets 14 molded in the step S12 (the resin sheets 14 prepared in the step S11 if the step S12 is not included) are welded to the liner body 12, to which the mouthpieces 13 are attached.

That is, the resin sheets 14 are heated to a temperature higher than the softening point of the material constituting the resin sheets 14, and are pressed against the liner body 12, to which the mouthpieces 13 are attached, so as to weld the resin sheets 14. The locations where the resin sheets 14 are arranged is as described above. Here, "welding" means welding as for the portions where the resin sheets 14 are superimposed on the liner body 12 (joining state where the resin sheets 14 and the liner body 12 are mixed with each other so that the interface thereof is unclear), and adhering to the faces 13e of the mouthpieces 13 as for the portions where the resin sheets 14 are superimposed on the faces 13e of the mouthpieces 13 (joining state by a physical anchor effect).

According to this, the liner 11 is made.

Figure 11:
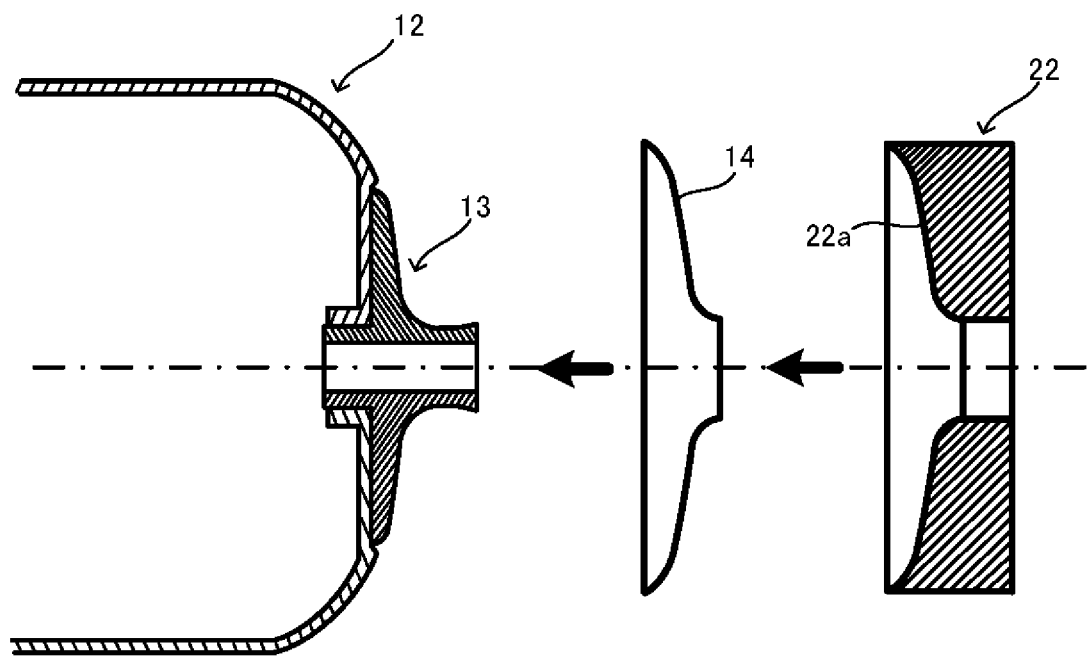
FIG. 11 illustratively shows a step S13 of welding the resin sheet.

In this example, as specifically shown in FIG. 11, each of the resin sheets 14 is arranged between the foregoing mold 22 and the portion where the resin sheet 14 is to be arranged on the liner body 12 to which the mouthpiece 13 is attached, and the resin sheet 14 is pressed against the liner body 12 to which the mouthpiece 13 is attached as being sandwiched between the liner body 12 to which the mouthpiece 13 is attached and the recessed face 22a of the mold 22, to be welded. At this time, the mold 22 is heated so that the temperature of the resin sheet 14 is at least the softening point.

As described above, according to the present disclosure, only welding of the resin sheet 14 makes it possible to smoothly arrange the resin sheets 14 at proper positions, which makes it possible to efficiently produce the high-pressure tank. That is, the cost of the installation of an applicator and costs for a drying oven which are necessary when a FIPG is used are reduced, and also the time for curing a FIPG is made to be unnecessary, which make it possible to complete processing for the high-pressure tank in a short time. It is also unnecessary to use an adhesive, which makes it possible to suppress faults such that tension of the fiber due to variations in the thickness and width of an adhesive layer distorts the resin sheets, to generate wrinkles and positional deviations when the fiber impregnated with a resin for the stiffener layer is wound.

<Step of Forming Layer of Fiber Impregnated with Resin>

In the step S14 of forming a layer of the fiber impregnated with a resin (which may be referred to as "step S14"), bundles of fiber which are impregnated with a resin in a semi-cured state are wound around the outer circumference of the liner 11 prepared in the step S13. The method for winding such bundles of fiber is not particularly limited, and may be according to any known method. For example, the filament winding technique may be used.

The present disclosure is not limited to the foregoing. Such a method may be also applied that the bundles of fiber which are not impregnated with a resin are wound around the outer circumference of the liner 11 to form a layer made of the bundles of fiber only, and thereafter a resin is injected into this layer made of the bundles of fiber only at high pressure to impregnate the bundles of fiber with the resin.

<Step of Curing Fiber Impregnated with Resin>

In the step S15 of curing the fiber impregnated with a resin (which may be referred to as "step S15"), the resin, with which the layer formed in the step S14 is impregnated, is cured. This curing encompasses, for example, heating with a heating furnace. The maximum temperature reached by the liner 11 and the fiber impregnated with a resin by the heating at this time, and the maximum temperature reached in the heating furnace lower than the softening point of the resin sheets 14 are preferable since being capable of suppressing deformation of the resin sheets 14.

Since a thermoplastic resin is softened by heating to be processed, and cures due to cooling when the thermoplastic resin is used as the resin with which the fiber is impregnated, the temperature for this processing (processing point temperature) is preferably lower than the softening point of the resin sheets 14.

<Others>

The present disclosure can suppress occurrence of malfunctions since the resin sheets 14 cover the gaps between the liner body 12 and the outer circumferential portions of the flange parts 13a of the mouthpieces 13 (gap C in FIG. 3) without the entry of the resin with which the fiber is impregnated into the gaps C as described above.

According to this, the high-pressure tank is made.

REFERENCE SIGNS LIST

10 High-pressure tank
11 liner
12 liner body
13 mouthpiece
14 resin sheet
15 stiffener layer

What is claimed is:

1. A method for producing a high-pressure tank, the method comprising:
  disposing a resin sheet on a liner body having a mouthpiece provided with a disk-shaped flange part, the resin sheet covering a gap between an outer circumferential portion of the flange part of the mouthpiece and the liner body, and an entire face of the flange part, the entire face being opposite to another face of the flange part which is in contact with the liner body, and heating the resin sheet and welding the resin sheet to the mouthpiece and the liner body, to make a liner; and
  forming a fiber layer around an outer circumference of the liner, the fiber layer being impregnated with a resin, and curing the resin,
  wherein a softening point of a material constituting the resin sheet is higher than a maximum temperature, the maximum temperature being reached by the liner due to heating of the resin, in said disposing, the resin sheet is welded to the mouthpiece and the liner body so that a joining state of the resin sheet and the liner body is such that an interface thereof is unclear, and before arranged on the liner body, the resin sheet is molded in advance so as to have a shape following a part where the resin sheet is to be arranged.

2. The method according to claim 1, wherein the resin sheet is made from a nylon resin.

\* \* \* \* \*